(12) United States Patent
DeRita

(10) Patent No.: US 9,534,412 B2
(45) Date of Patent: Jan. 3, 2017

(54) WALL SYSTEM AND WATERPROOF PANEL

(71) Applicant: Michael DeRita, Mount Laurel, NJ (US)

(72) Inventor: Michael DeRita, Mount Laurel, NJ (US)

(*) Notice: Subject to any disclaimer, the term of this patent is extended or adjusted under 35 U.S.C. 154(b) by 0 days.

(21) Appl. No.: 14/461,085

(22) Filed: Aug. 15, 2014

(65) Prior Publication Data
US 2016/0047117 A1    Feb. 18, 2016

(51) Int. Cl.
*E04B 2/02*     (2006.01)
*E04H 9/14*     (2006.01)
*E04G 23/02*   (2006.01)
*E04B 2/74*     (2006.01)
*E04B 1/00*     (2006.01)

(52) U.S. Cl.
CPC .......... *E04H 9/145* (2013.01); *E04B 2/02* (2013.01); *E04B 2/7457* (2013.01); *E04G 23/02* (2013.01); *E04B 1/0007* (2013.01); *E04B 2002/0202* (2013.01); *E04B 2002/0256* (2013.01); *E04B 2002/7468* (2013.01)

(58) Field of Classification Search
CPC .. E04B 2002/7468; E04B 2/7457; E04B 2/02; E04B 1/0007; E04B 2002/0202; E04B 2002/0256; E04H 9/145; E04G 23/02
USPC .................. 52/DIG. 5, 471, 481.1
See application file for complete search history.

(56) References Cited

U.S. PATENT DOCUMENTS

| | | | | |
|---|---|---|---|---|
| 3,292,328 A * | 12/1966 | Darling | ................ | E04B 2/82 52/238.1 |
| 3,609,934 A * | 10/1971 | O'Carroll | .......... | E04F 13/0801 428/900 |
| 3,852,935 A * | 12/1974 | Jones | .................... | E04B 2/7457 52/238.1 |
| 3,982,370 A * | 9/1976 | Buffington | ............ | E04B 2/7457 52/481.2 |
| 3,986,312 A * | 10/1976 | Calhoun | ............... | E04B 2/7457 52/242 |
| 4,265,064 A * | 5/1981 | Parezo | .................... | E02D 31/02 52/169.14 |
| 4,709,522 A * | 12/1987 | Carnahan | ............ | E04F 19/0436 52/288.1 |
| 4,835,923 A * | 6/1989 | Ybarra | .................. | E04B 2/7409 52/238.1 |
| 6,311,441 B1 * | 11/2001 | Beavers | ................ | E04B 2/7422 52/220.7 |
| 7,882,668 B2 * | 2/2011 | Pedersen | ............. | E04B 1/7092 454/284 |
| 8,297,015 B2 * | 10/2012 | Martin | ................. | E04B 1/7092 52/302.1 |

(Continued)

*Primary Examiner* — Babajide Demuren
(74) *Attorney, Agent, or Firm* — John F. A. Earley III; Frank J. Bonini, Jr.; Harding, Earley, Follmer & Frailey, P.C.

(57) ABSTRACT

A waterproof removable panelized wall system permanently resistant to water damage. The present system may be included as part of a complete basement fit out, or may be utilized in a restoration of an area that has incurred water damage and may be used to repair of a wall structure that has been compromised or damaged by a wet condition. A plurality of waterproof, non-absorbent panels are arranged in a wall structure and are removable from and reinstallable on the wall structure. An attachment mechanism in the form of a magnetic component, such as, a magnetic strip or a plurality of magnets is provided to releasably secure the panels and moldings to the wall frame structure.

25 Claims, 6 Drawing Sheets

(56) References Cited

U.S. PATENT DOCUMENTS

2007/0017174 A1* 1/2007 Lavell ............... E04F 19/04
  52/267
2009/0282759 A1* 11/2009 Porter ............... E04B 2/7457
  52/220.1

* cited by examiner

WALL SYSTEM AND WATERPROOF PANEL

BACKGROUND OF THE INVENTION

1. Field of the Invention

The present invention relates to the field of wall construction and more particularly a wall system for providing a waterproof, removable wall panel and panel arrangement for use in wet environments or conditions.

2. Brief Description of the Related Art

As was unfortunately made evident due to the flooding caused by "Superstorm Sandy", in the year 2012, when flooding occurs inside homes and buildings which have wall structures that are finished with drywall, the water from the flooding destroys all the drywall the water comes in contact with, and the water creeps behind the drywall creating wet or at least damp conditions behind the drywall, which can lead to the formation of harmful mold and the like. As a way to handle this water damage problem, it is routine to cut out the wet, damaged portion of the dry wall from the remainder of the wall (such as by cutting away the lower portion of the drywall), and remove the wet, damaged portion of the drywall from the remainder of the wall so as to allow the wall structure behind the drywall to dry and/or be treated for mold prevention/remediation. Then, after the flooded area has been dried and/or treated with mold prevention/remediation methods, replacement drywall portions are cut to match the portions of the drywall that have been removed from the wall structure. The replacement drywall portions are mounted on the wall structure in place of the wet, damaged drywall portions that have been removed. After the installation of the replacement drywall portions, various coats of drywall joint compound and drywall tape are applied to the seams between the replacement drywall panels and between the replacement drywall panels and the original drywall panels that remain on the wall structure adjacent to the newly mounted replacement drywall panels. The drywall joint compound must be allowed to dry, and then replacement drywall and any joints are sanded. When the sanding and finishing of the drywall surface has been completed, the replacement drywall must be coated with a primer and painted.

Replacing wet, damaged drywall is expensive and burdensome. In addition, failure to take remedial steps to replace damaged drywall or replace drywall damaged by water, such as water from a flood, creates not only a visually unpleasing wall, but also creates bad odors and may lead to the formation of dangerous molds which are hazardous to the health of people living or working in the home or business that was damaged by flood waters.

One acknowledgment of wet conditions is found in U.S. Pat. No. 7,882,668 B2, which discloses a wall shoe that is placed under the bottom edge of a sheet of drywall such that the drywall is elevated above the floor level. The wall shoe may be installed during construction or thereafter. The wall shoe has channels through the wall shoe to allow the lowest portions of a wall to be dried without removing either the drywall or the wall shoe. U.S. Pat. No. 8,297,015 B2 discloses a system for drying wall cavities that includes a permanently installed wall cavity and filtration system having molded base dry block members that are installed along the base of a wall between the floor and the bottom edge of drywall, gypsum board or other conventional interior wall construction material.

U.S. Pat. No. 3,852,935 relates to providing a common wall between two rooms and discloses a metal stud which on oppositely disposed sides thereof holds a magnetic strip within one or more longitudinal open channels. Corresponding metal strips are secured to the wallboards which in turn are supported on each side of the stud by the magnetic force exerted on the strips in order to support the common wall between two rooms. U.S. Pat. No. 3,982,370 discloses a demountable partition panel system and method of assembling a wall structure by using removable panels on which magnetic elements or units are provided to mount the panels on a frame of the wall structure. U.S. Pat. No. 3,609,934 discloses plasterboard mounted to studs according to common practice, there being magnets embedded in the mounted plasterboard, and a surface paneling with magnets is provided so that the surface may be removed from the plasterboard panel. U.S. Pat. No. 4,068,434 discloses a composite wall panel assembly and method of production.

U.S. Pat. No. 5,077,950 discloses simulated window pane molding using magnetic elements. U.S. Pat. No. 8,225,562 B2 discloses improved simulated authentic divided-light windows, where an internal muntin grid structure, equipped with multiple neodymium magnets, is sandwiched between the panes of a double-glazed, sealed window pane, and an external muntin grid is removably attached to each side of the sealed window pane.

U.S. Pat. No. 4,934,119 relates to a movable wall or partition assembly having panels magnetically secured to studs by magnetic clips. U.S. Pat. No. 6,311,441 B1 relates to wall modules formed with steel upstanding support modules with integrally formed vertical spaced apart support components with forwardly facing panel support surfaces, and discloses thin, typically flexible panels having strip magnets adhesively bonded to the rearward surface about their periphery. U.S. Pat. No. 3,986,312 relates to a demountable wall assembly, and US Patent Application US 2004/0255539 A1 relates to a wall system that utilizes a u-shaped connector to compressibly hold together vertical support component edges.

U.S. Pat. No. 4,709,522 relates to a demountable ceiling molding using magnetic mounting bars that are installed on a wall. US Patent Application no. 2006/0070329 A1 relates to a modular wall paneling system, wall panels and an installation method that utilizes upper and lower rails for panel mounting, for example, to wainscot an existing wall. U.S. Pat. No. 5,129,138 relates to a drywall system where a metallic frame structure utilizes filler strips to secure drywall panels. The filler strips are formed to encompass and bridge gaps between drywall panels. The '138 patent discloses that the filler strips include a planar forward strip mounting a rearwardly extending longitudinally aligned projecting strip with a magnetic strip mounted to a rear end surface of the projecting strip to secure each filler strip to an associated metallic rail.

SUMMARY OF THE INVENTION

A waterproof removable panelized wall system that is permanently resistant to water damage is provided. The present system may be included as part of a complete basement fit out, or, alternatively, may be utilized in a restoration of an area that has incurred water damage. The present invention provides a system that is designed to facilitate making a repair of a wall structure itself or a repair of a structure adjacent to the wall structure that has been compromised or damaged by a wet condition. The invention facilitates remediation of a wet wall condition by providing a wall structure and system for facilitating addressing a wet condition of the wall structure or adjacent structure, including in an area behind a wall.

A system for replacing drywall wall that makes it more economical and easier to address damage as a result of wet conditions, such as, for example, exposure to flooding or storms, and where the system is suitable for handling wet conditions that may intrude on the system components.

According to another embodiment, the panels and system may be installed in new construction to facilitate water handling by removing the panels prior to an anticipated weather condition, or, in the event of water intrusion (e.g., where unexpected), removing the panels after the event.

According to one preferred embodiment, at least one waterproof non-absorbent wall panel is provided. Preferred embodiments provide a wall system wherein a plurality of waterproof, non-absorbent panels are arranged in a wall structure and are removable from and reinstallable on the wall structure.

It is a further object of the invention to construct the wall panel from a waterproof and water-resistant material. According to preferred embodiments, the wall panel may be made from a plastic (such as polyester) or vinyl. According to some alternate embodiments, the wall panel may be made from metal or glass, or combinations of waterproof materials, such as, for example, combinations of plastic/vinyl and metal or glass.

According to preferred embodiments, the wall panel preferably is sized to be about three feet high and may be easily mounted to the wall structure below the wall surface covering the upper portion of the wall structure (such as drywall that covers the upper portion of the wall structure). The wall panel, according to the invention, is selectively, easily detachable from the wall structure when it is desired to gain access to the wall structure or adjacent components of the wall or wall structure (such as, for example, the space behind the drywall) to treat flooding problems (e.g., to permit drying of a flooded area, including a wall structure of the room that has come into contact with water from a flood, and to permit mold prevention/remediation methods to take place in the flooded area in the space behind the drywall if necessary). Alternatively, the present selectively removable wall structure component facilitates gaining access to such things as plumbing lines, electrical wiring conduits, television/computer cabling or other components that may be located behind a finished wall (e.g., a wall that is traditionally finished with drywall paneling).

According to a preferred embodiment, a system is provided, where a plurality of panels are utilized, with each panel provided with means or a mechanism for removably attaching the panel to the studs of the wall structure. According to one preferred embodiment, the attachment means or mechanism may include a magnetic component, such as, a magnetic strip (or a plurality of magnets).

It is another object of the invention to provide decorative surfaces or design elements, such as moldings mounted thereon (e.g., chair rails, base boards), and more preferably moldings that match those of the adjacent or adjoining walls or wall structures. A further object of the invention is to provide the decorative moldings so that they are removably attachable to the panel. Preferably, the decorative moldings (e.g., such as a chair rail and baseboard) may be magnetically attached to the panel.

It is a further object of the invention to provide a kit for installing a waterproof wall system that includes removable panels and components for an installation, including components for installation on existing wood studs of an existing wall.

BRIEF DESCRIPTION OF THE DRAWING FIGURES

FIG. 1b is a rear elevation view of the panel of FIG. 1a.

DETAILED DESCRIPTION OF THE PREFERRED EMBODIMENTS

Figure 1A:
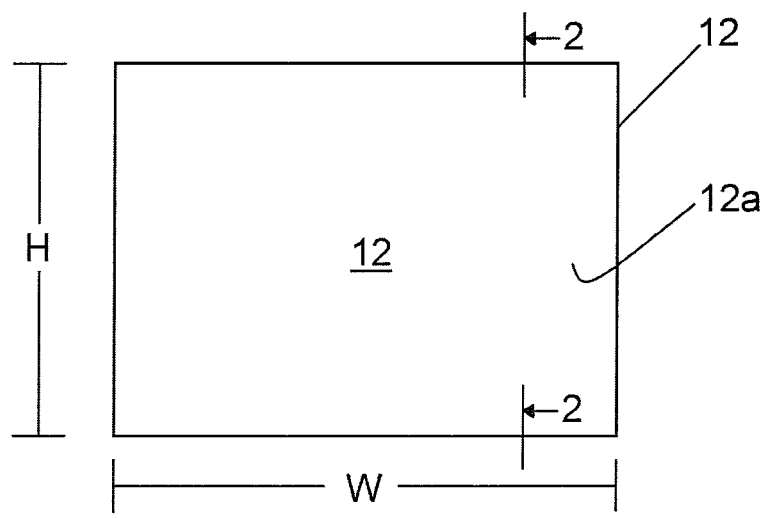
FIG. 1a is a front elevation view of a first embodiment of a panel according to a preferred embodiment of the invention.
Figure 1B:
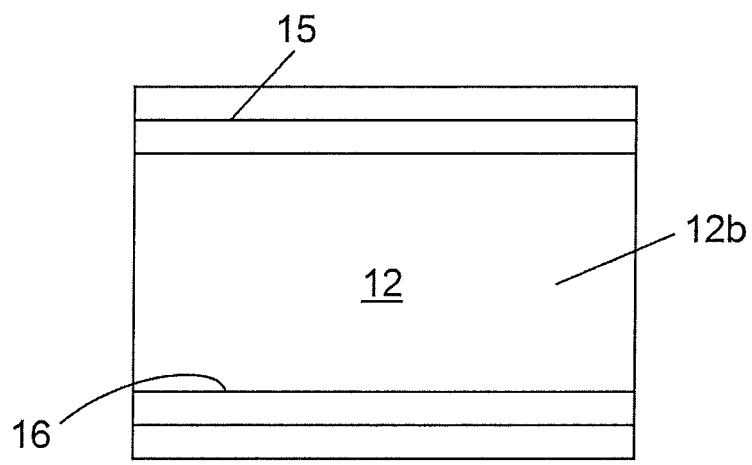

Referring to the drawing figures, there is illustrated a system 10 for a wall construction in accordance with the invention. According to a preferred embodiment, the wall or panel system 10 includes a plurality of panels 12. Referring to FIGS. 1a and 1b, a panel 12 preferably is provided, and is shown having a front with a front surface 12a and a rear with a rear surface 12b. The panel 12 preferably has a height (H) and a width (W). The height (H) preferably represents a portion of a wall height in a wall in which the panel 12 is to be installed and form a part thereof. According to one preferred embodiment, the panel 12 has a height of about three feet, providing for a removable lower portion of a wall surface to be above three feet. Panels 12 preferably are provided in standard drywall thicknesses, which may be ½", ⅝" and other common or popular drywall thicknesses. One preferred embodiment provides a panel 12 that is four feet in width (W) and three feet high (H). The panels 12 are designed and configured having a size and weight so that they may be easily removed, and, preferably, by a single individual, in the event of an existing or impending condition that requires their removal from the wall structure, such as, for example, a condition of water intrusion or a pending storm or flood. Aside from standard dimensions and thicknesses, alternatively, the panels 12 may be provided in customized lengths and heights. For example, in the case of a wall section, such as where a chair rail or other molding is placed at a height other than three feet (for example, where there already exist moldings on other walls in the room), the panel height may be provided to coincide with the height of the existing molding. The panel 12 may be provided with moldings at an edge thereof, or, alternately at any location desired with which to match existing or other adjacent moldings. In some embodiments, the molding may be placed on the wall structure to which the removable panel 12 is removably installed. For example, the removable panel 12 may be installed to be positioned slightly below the molding, and slid upwardly so that the upper edge of the panel 12 is under the molding.

As shown in FIG. 1a, the panel 12 has a front with a surface 12a. The front surface 12a preferably may form the exterior of the panel 12 and the exposed area that faces the room or finished area. According to some embodiments, the panel surface 12a may be provided with a prefinished surface, preferably a decorative surface that may, for example, be finished with paint, decorative wall paper, a lamination or other surface treatment. Alternatively, the panel 12 may be constructed from a material, such as, for example, plastic, vinyl, glass or steel and that material may form the finished panel surface 12a. Optionally, the rear panel surface 12b also may be finished with a decorative or other surface.

Figure 2:
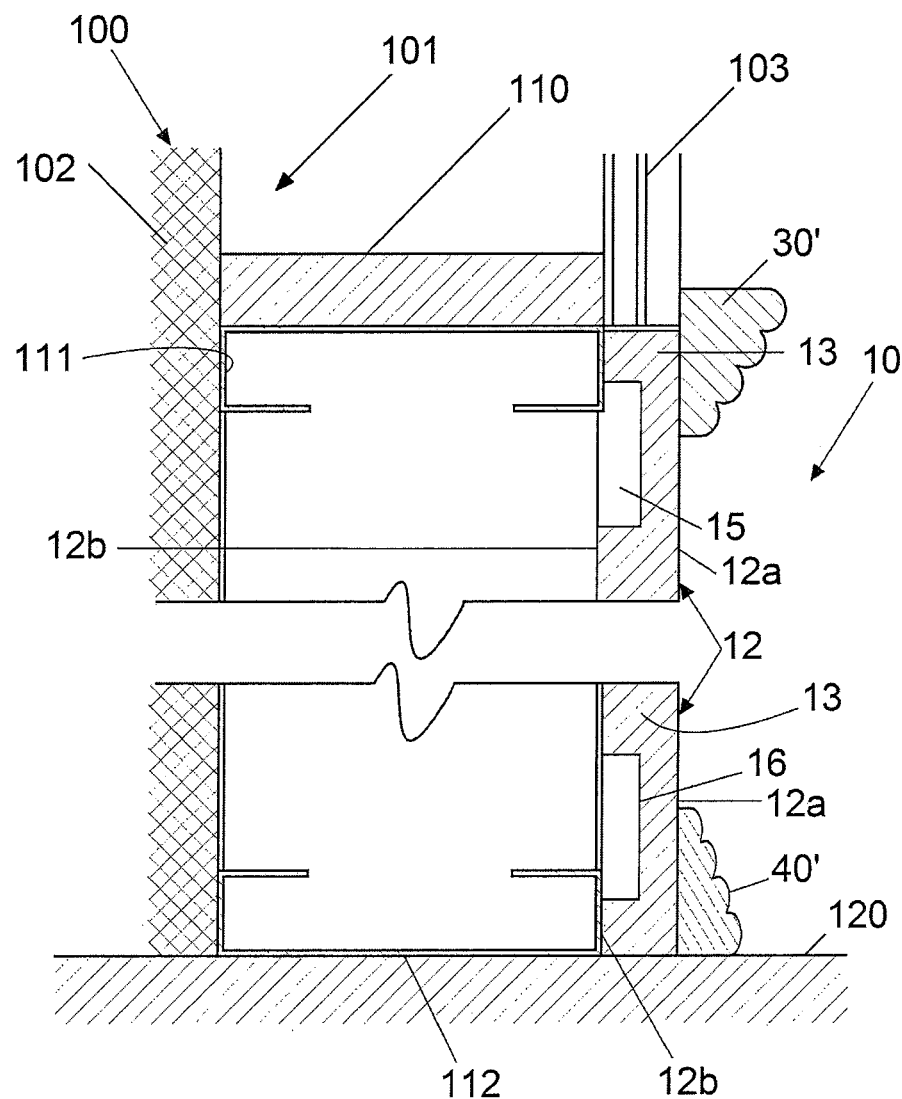
FIG. 2 is a sectional view of a wall, as viewed from the left side, in which the panel of FIGS. 1a and 1b is installed in accordance with a first installation environment embodiment.

According to preferred embodiments, the panel 12 may be constructed having a strong yet lightweight configuration for ease in shipment and handling. The panel 12 has an interior or thickness 13, which, as is shown in FIG. 2, spans between the front panel surface 12a and rear panel surface 12b. In some embodiments, the thickness 13 of the panel 12 may be a solid structure, while according to other embodiments, the thickness 13 of the panel 12 may be non-solid, and may include a support structure. One preferred configuration is that the panel 12 is constructed having a honeycomb lattice, the lattice preferably comprising the panel thickness 13 between the front panel surface 12a and rear panel surface 12b (FIG. 1b).

According to preferred embodiments, a magnetic means preferably comprising a magnetic element for facilitating removable attachment of the panel 12 to a structure is provided. Preferably, the magnetic means is provided on each removable panel 12 for removably attaching the panel 12 to studs of a wall structure. According to one preferred embodiment, a magnetic element may be configured as a magnetic strip (or alternately as a plurality of magnets) mounted on and extending across the panel 12. According to preferred embodiments, the magnetic means (e.g., strips or magnets) are provided at the upper portion of the panel 12 and the lower portion of the panel 12. Referring to FIG. 1b, the magnetic elements are shown configured as magnetic strips 15,16, with the upper magnetic strip 15 being located on the top of the panel 12 and the lower magnetic strip 16 being located at the bottom of the panel 12.

Figure 8:
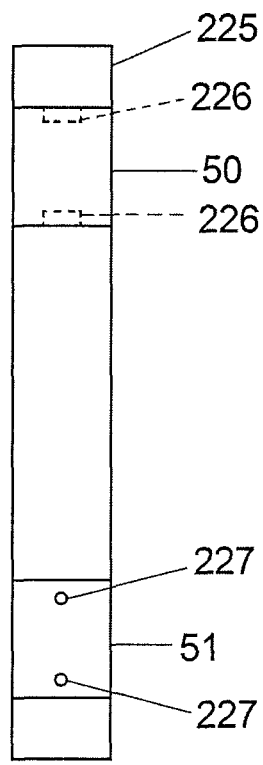
FIG. 8 is a front elevation view of a stud shown with metal strips installed thereon.

The present panel system 10 is useful in connection with drywall systems, where wood or metal studs form the support for the existing drywall. According to one implementation, the present system 10 is utilized by configuring the existing wall system for receiving the panels 12. According to a preferred embodiment, an existing wall system structure may be used, such as, for example, the studs and/or framework on which the prior or existing wall panel surface is supported and attached. For example, in an existing drywall system, there may be studs already in place, which may be wood studs or metal studs. According to one preferred embodiment, installation of the present system 10 may be accomplished with the studs of the existing system remaining in place. According to this installation process, the lower portion of the wall surface, such as damaged drywall or portion of drywall that is to be removed for the panels 12 to occupy, is removed from the studs. The removal of existing drywall or wall surface may involve removal of a wall section, preferably, the lower wall section, such as, for example, the first three feet of height of the lower wall section. The studs, metal or wood, are then exposed. In the case where wood studs are present, the wood studs may be fitted with a magnetic or magnetizable element. According to one embodiment, the magnetic or magnetizable element comprises a metal strip or plate that is installed on the wood studs, and to which a panel magnetic strip 15 or 16 may magnetically attach through magnetic attraction. FIG. 8 shows an illustration of an exemplary embodiment where metal strips, including an upper metal strip 50 and a lower metal strip 51 are installed on a wood stud 225. Points 226 (which may be integrally provided with a metal strip), fasteners 227 (such as a nail) or combinations of these may be used to secure the metal strips 50,51 to a stud 225. Preferably, the metal strip that is applied to the wood (or non-magnetic studs) is countersunk to remain flush with the stud surface to provide a level attachment for the panels 12. The magnetic or magnetizable elements preferably are located on the studs in areas where the panel magnets will align for attachment. According to a preferred embodiment, a first magnetic or magnetizable element is installed at the top of the exposed portion of the stud, and a second magnetic or magnetizable element is installed at the bottom of the exposed portion of the stud. The magnets or magnetic strips of the panel 12 will attach to the stud via the metal strip or plate installed on the stud. As discussed herein, the magnetic or magnetizable element may be countersunk to be flush with the front surface (facing surface) of the stud.

Alternatively, where the existing studs of an existing wall system are metal studs, then the panels 12 may be attached to the studs using the magnetic elements, such as the magnetic strips 15,16 of the panel 12. Where the existing metal studs, or metal studs used to construct the lower wall portion that is to receive the panels 12 have magnetic capability (e.g., a magnet may magnetically attach through magnetic attraction to the metal studs), then the panels 12 may be installed onto the metal studs. Where the metal studs do not possess the capability for a magnetic attraction with the panel magnetic component, then a strip may be applied, as discussed herein with wood (or non-magnetic and/or composite studs).

Figure 3:
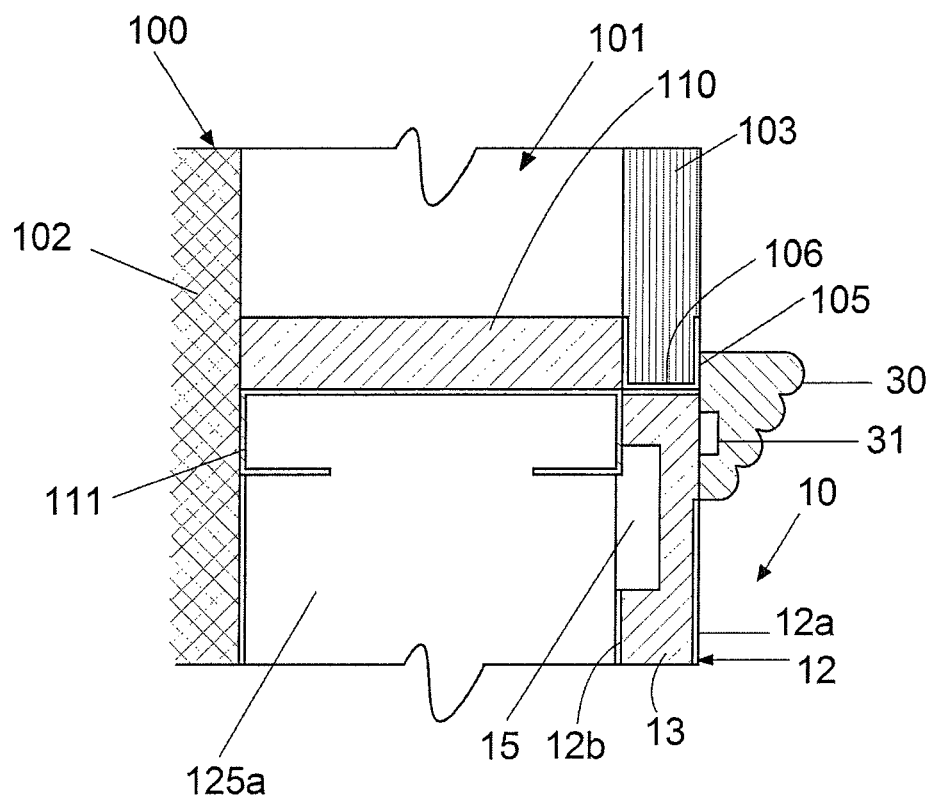
FIG. 3 is a sectional view of the upper portion of the panel and environment shown in FIG. 2, illustrated with an optional u-channel installed on the lower edge of the drywall.

An existing wall structure may be an already damaged wall structure that has been damaged by water, or may be a wall structure that is to be configured for use with the removable panels 12. According to another embodiment, the installation of the present system on an existing wall system, or if constructing a new wall system, may be done according to an alternate method. The wall structure is prepared so that the wall surface material of the lower portion of the wall, where the present panel system is to be installed or used, is removed from the existing framing or studs, or, if new construction, then the wall structure is finished in accordance with the following. Referring to FIGS. 2 and 3, according to a first preferred embodiment, the wall surface material (where there is an existing wall structure) is removed at an even height across the wall 101 of the existing wall system 100 so that panels 12 of a uniform height may be installed to form the new wall surface in that area of the wall surface.

Referring to FIG. 2, the panel system 10 is shown installed in an exemplary environment, which is depicted as a basement wall 102. The basement wall 102 preferably is a masonry wall, and, in the exemplary illustration, is shown having a wall structure that includes a wall system 100, illustrated as a wood frame drywall system. According to an alternate embodiment, the present system includes configuring an existing wall system for receiving the panels 12 with the use of a newly constructed lower wall portion. According to a preferred embodiment, the existing wall system 100 (which may be an already damaged wall system that is damaged by water, or may be a wall system that will be configured for use with the removable panels 12) is prepared so that the wall surface material of the lower portion of the wall where the present panel system 10 is to be installed is removed from the existing framing or studs. (The wall surface material may be omitted, in the case of new construction, in order to allow the present system 10 to be installed.) According to a preferred embodiment, the wall surface material is removed at an even height across the wall 101 so that panels 12 of a uniform height may be installed to form the new wall surface in that area of the wall surface.

Figure 5:
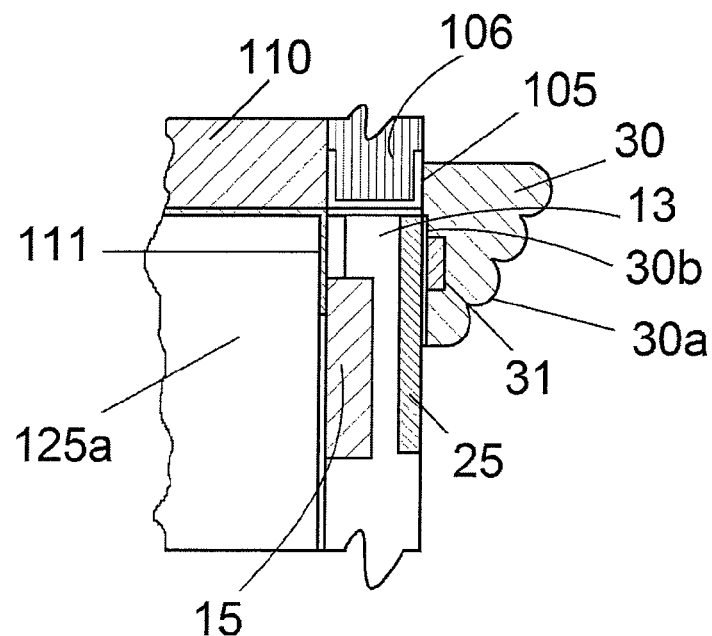
FIG. 5 is an enlarged sectional view showing the upper portion of the panel and chair rail of the first installation environment illustrated in FIG. 3.

According to one preferred installation method for configuring the system, a new wood frame header 110 is installed along the top of the area where the drywall wall surface panel 103 ends (see e.g., FIGS. 2, 3 and 5). In some preferred embodiments, a u-cap 105 (FIG. 3) may be installed along the drywall lower edge 106 to protect the edge of the drywall 103 and provide a finished lower edge, to prevent the drywall lower edge 106 from powdering and cracking. Preferably, a header 110 is provided according to this optional installation method. The header 110 provides support for the drywall portion of the wall structure. The header 110 may be provided as a continuous header along the location where the panels 12 are to be installed. The header 110 also provides a structure to which a metal framing stud 111 may be mounted. As shown in FIG. 3, the metal stud 111 provides support for the upper edge of the panel 12. The metal stud 111, according to some embodiments, also may serve as an attachment point for the upper magnetic element, such as the magnetic strip 15, of the panel 12 (as best shown in FIGS. 2 and 5).

Figure 4:
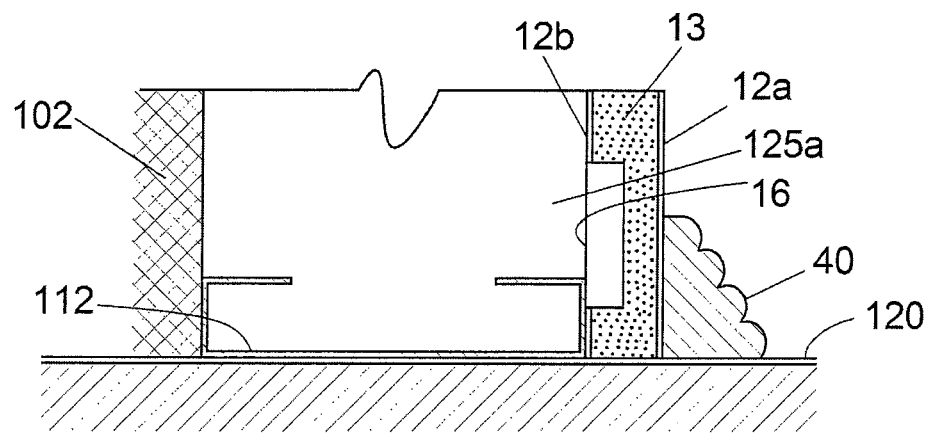
FIG. 4 is a sectional view of the lower portion of the panel and environment shown in FIG. 2, illustrating the attachment detail for a panel installed on a metal stud.
Figure 7:
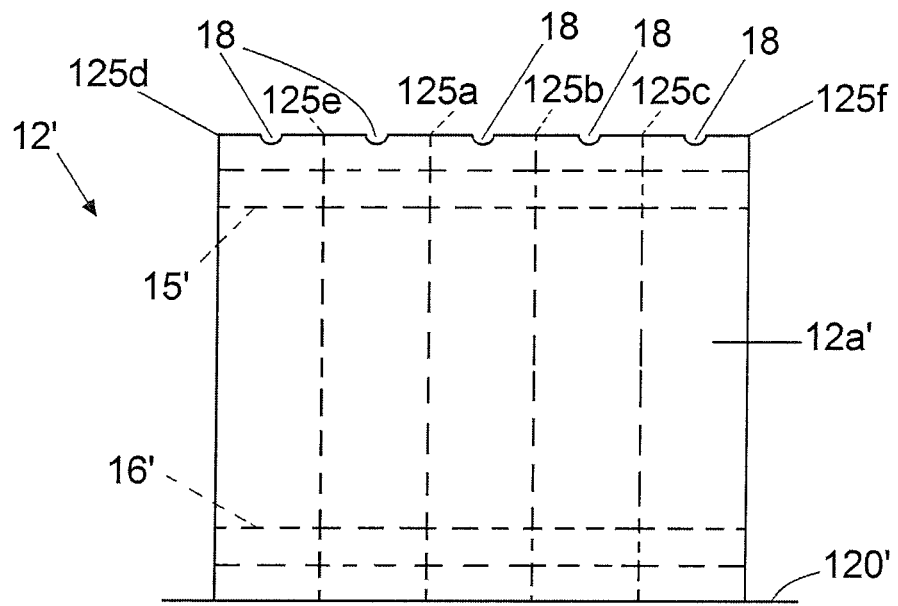
FIG. 7 is a front elevation view of a second embodiment of a panel according to the invention having an alternate configuration with grasping portions at the top thereof.
Figure 6:
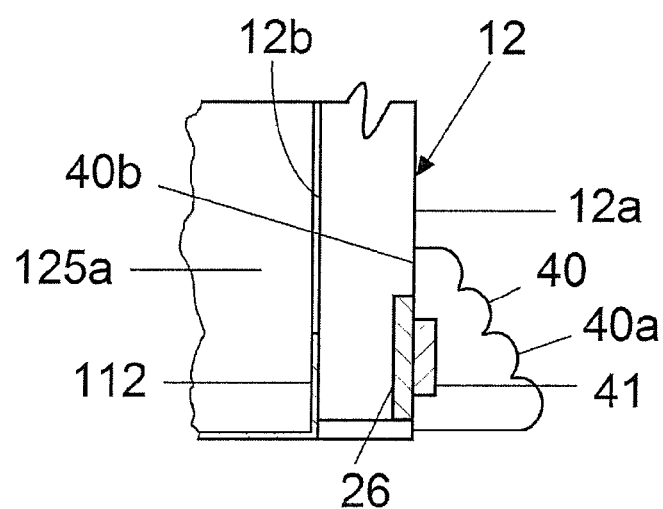
FIG. 6 is an enlarged sectional view showing the lower portion of the panel and baseboard of the first installation environment illustrated in FIG. 4.

The system and panel installation shown in FIG. 2 is illustrated in a room having a floor 120, which may, for example, be carpeting or tile. A bottom or floor plate 112 is shown installed at the bottom of the panel wall system section (see FIGS. 2, 4 and 6). The panel 12 is shown installed on the wall frame between the metal stud or header 111 and the floor plate 112. According to one embodiment, the metal header 111 and floor plate 112 provide a surface of the wall structure on which to mount the panels 12 using the magnetic elements, such as, the magnetic strips 15,16. Preferably, the metal header 111 and floor plate 112 are made from a material to which a magnet will magnetically attach. According to preferred configurations, the system preferably includes stud framing to form the support for the lower wall portion on which the panels 12 are removably installed. Referring to FIGS. 5 and 6, a stud 125*a* is shown in the wall construction, and preferably is installed in the wall lower portion along with a plurality of other studs which, according to a preferred arrangement, are adjacently spaced apart from each other. FIG. 7 shows a schematic representation of studs 125*a*,125*b*,125*c*,125*d*,125*e*,125*f*, arranged to form a lower wall structure to which a panel 12,12' may be removably attached. The panel 12' included magnetic strips 15',16' on the rear of the panel 12'. Although the panel 12 is referred to herein, the alternately depicted panel 12' may be constructed and used in a similar manner, with the difference being that the alternate panel 12' includes a preferred cut-out 18, which preferably is a finger cut-out, dimensioned to fit one or more fingers of an individual to facilitate removal of the panel 12' from the structure (e.g., studs). According to a preferred embodiment, the finger cutouts are provided in each panel and spaced at even distances. Preferably, the finger cutouts 18 are located strategically between or proximate to the attachment points so the magnetic attachment between a panel 12' and a stud 125*a*, 125*b*, 125*c*, 125*d*, 125*e*, 125*f* may be released. One preferred embodiment provides cut-outs 18 every 8 inches. Alternate embodiments may provide different spacing arrangements for the cut-outs 18.

The studs utilized in the lower wall construction (or wall construction) preferably are metal studs, but alternately, may be wood studs which are provided with a magnetic capability as discussed herein (e.g., with a metal strip thereon). The stud framing for the lower wall portion of the wall structure preferably is spaced to accommodate and correspond with the widths of the panels 12. One preferred embodiment provides the studs every 16 inches, on center, for installation of panels 12 which are four feet in width. Studs may be mounted and spaced according to what a building code may require.

Alternatively, for a cleaner look when the panels are being removed, installed, or stored, the magnetic component, such as the magnetic strip or magnet, when provided on the rear of the panel surface 12*b*, may be covered with a decorative material or backing to provide a seal as against dust. Similarly, as discussed herein, where the panel 12 is provided with front magnetic components on the panel front, the panel front magnetic components may be covered with a covering surface. The covering surface may form the panel front surface 12*a* (FIG. 1*a*). The covering of the magnetic components of the panel rear may fouls the panel rear surface 12*b* (FIG. 1*b*). Referring to FIG. 7, this may be done also in connection with the alternate panel 12', where a surface 12*a*, is shown.

According to preferred embodiments, metal studs may be used in the wall structure to which the removable panel 12 is to removably attach. In environments where metal studs are used in the wall structure, the magnets of the panel 12 are aligned with the metal studs to hold the panel 12 to the metal studs. In environments where the wall is constructed using wooden studs (or other non-magnetically affected material, e.g., plastic), then the invention includes metal components, such as, for example, strips of metal 50,51 (FIG. 8) mounted on the wooden studs 225. Preferably, the strips of metal 50,51 are mounted on the studs (such as the stud 225) at heights that correspond with the location (e.g., height) of the magnets (e.g., magnetic strips 15,16) that are mounted to or otherwise carried on the panels 12. Referring to FIG. 8, a first metal strip 50 may be mounted at the upper location of the wooden stud 225 to provide an attachment location for the upper magnetic strip 15 of the panel 12, and a second metal strip 51 may be mounted at the lower location of the wooden stud 225 to provide an attachment location for the lower magnetic strip 16 of the panel 12.

When a room, such as a finished basement, is flooded, rather than having to cut out wet, damaged drywall, dry the flooded area and/or treat the flooded area with mold prevention/remediation methods, and then replace the wet, damaged drywall that was removed with new drywall, as is the common practice, such rooms having the inventive wall system installed only require that the inventive panel 12, or inventive panels 12 (if there are plurality of panels), be removed from the wall structure by merely pulling on them to disengage the panel magnet from the studs, thereby instantly gaining access to the wall structure (e.g., the structure of the wall behind the drywall). The wall system 10 of the present invention provides lightweight and easy to remove and replace panels 12. The panels 12 preferably may be removed from the wall structure prior to an anticipated storm or when the potential for flooding is present, e.g., including at such time when flooding is inevitable based on a hurricane headed toward the home or business, or other condition likely to affect the building. The removal of the panels 12 avoids having to dry the panels 12, should they otherwise be present when the water infiltrates the structure. In an installation where the panels 12 are removed, and water infiltrates the structure from which the panels 12 have been removed, as, for example, in a finished basement, the wall structure is dried and any mold prevention/remediation methods are enacted. Once dried and/or treated, the wall structure may be re-covered with the inventive wall panels 12 by placing the panels 12 in position on the wall structure, permitting the magnets (such as the magnetic strips 15,16) to hold the inventive panels 12 to the studs of the wall structure. According to a preferred embodiment, as shown in FIGS. 2 and 3, the system 10 is configured so that the upper portion of the wall structure, which is made from drywall 103, may remain above the location where water may be expected, and above the location where, the magnetically removably attachable panels 12 are installed Since most flooding is lower than three feet in height on a wall, in those cases, the flood waters cause no damage to the drywall 103 mounted on the wall structure above where the inventive panels 12 are connected to the wall structure, since the higher located drywall 103 does not come into contact with the flood water. Accordingly, with the invention in place, the costs and burdens of replacing damaged, wet drywall caused by flooding no longer exist.

Figure 9:
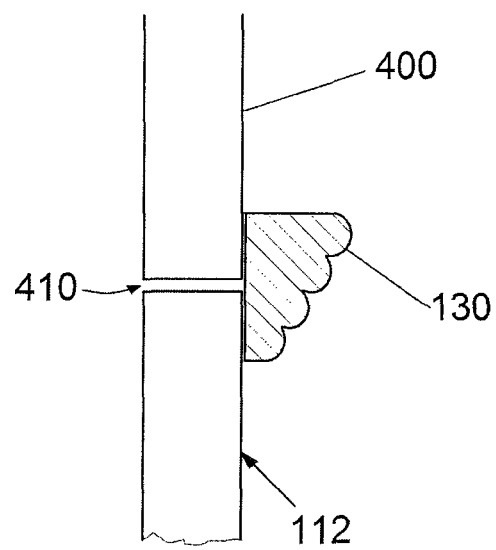
FIG. 9 is a left side elevation view of an alternate embodiment of a panel and wall system configuration of the invention.

According to some preferred embodiments, the inventive panels 12 have finishing elements installed on the panels 12 for decorative purposes, such as, for example, a chair rail 30 mounted thereon and a baseboard 40 mounted thereon. According to one embodiment the chair rail 30' shown in FIG. 2 may be mounted to the upper wall position (non-removable wall portion) and the top edge of a panel 12 slid thereunder. According to another embodiment, as shown in FIG. 9, the chair rail 130 is on a panel 112 to overlap the panel top edge so that the chair rail 130 covers the seam 410 between the upper wall surface 400 and the panel 112. According to an alternate embodiment, a panel (not shown) may have a baseboard mounted thereon. According to some embodiments, the panel may be installed with a baseboard already mounted thereon, or a chair rail already mounted thereon or both mounted thereon. According to a preferred embodiment, the chair rail 30 is shown in FIG. 5 having a magnetic attachment location for magnetic attachment to the front of the panel 12. Preferably, a front magnetic component 25 is provided on the panel front in the location of attachment. The front magnetic component 25 preferably is shown as a first or upper front magnetic component 25 for attachment of the upper molding or chair rail 30. A second or lower front magnetic component 26, shown in FIG. 6, also is provided on the front of the panel 12 for attachment of the lower molding or baseboard molding 40. The front magnetic components 25,26 may be covered with a covering surface, as discussed in connection with the covering of the rear panel surface 12b. Preferably, the covering surface may form the panel front surface 12a. The decorative moldings may be installed and removed from the front of the panel 12, as desired. Referring to FIG. 5, the chair rail 30 has a front 30a and a rear 30b. Magnetic material, such as, for example, a magnetic or metal strip 31, made from magnetizable material or material to which a magnet is attracted, is provided on the rear 30b of the chair rail 30. The chair rail 30 is removably magnetically attachable to the panel front 12a at a location corresponding with the panel front upper magnetic component 25. Referring to FIG. 6, the lower molding or baseboard 40 has a front 40a and a rear 40b. Magnetic material, such as, for example, a magnetic or metal strip 41, made from magnetizable material or material to which a magnet is attracted, is provided on the rear 40b of the base molding 40. The base molding or baseboard 40 is removably magnetically attachable to the panel front 12a at a location corresponding with the panel front lower magnetic component 26.

The present system 10 is provided to be unique and stylish, yet is designed to be practical and easy to install and replace. According to preferred embodiments, the finished surface may be provided in a variety of colors and patterns, or a simple matt white paintable finish. In addition, as further options, accents, such as chair rail molding 30 and baseboard molding 40, may be provided in connection with the panel system 10 to further facilitate an aesthetic design, for a beautiful finished product, including matching the adjacent or preexisting structures. For example, where an adjacent or other interior wall is not utilizing part of the present wall system 10, the wall system 10 may be provided to match the design and moldings already installed on existing wall structures or nearby walls. In addition, the present system 10 also allows the user to change the entire appearance and dynamic of any room by simply replacing or painting the panels 12 any time a new look is desired. The present system 10 is designed to be used in a multitude of locations, including residential and commercial uses, where the system 10 may be installed anywhere in a home or in a business. As discussed herein, the most useful application for the present system is in any area that is prone to dampness or water intrusion, such as a finished basement. The panels 12 shown and described herein may easily be removed in anticipation of a storm or flood and moved to another location, such as a higher location within the home, or other remote location. However, if it is not possible or practical to remove the panels 12, and the area does flood, the present waterproof wall system may be easily and readily detached for complete structural drying (e.g., of the area that it covered when installed) and mold prevention. Once the water is removed and the wet areas are dried and/or otherwise treated, the panel walls of the present system may be replaced. The present system eliminates the need to have to cut out wet drywall or paneling and repair the entire room simply because the walls became wet or damp. The ability to readily expose areas behind the walls by selectively removing the panels 12 of the present system (and even cleaning them or drying their surfaces) further facilitates the elimination and minimization of mold and mildew growth, which are known to cause dangers to health.

According to another embodiment, the system is provided in a kit form, which may be installed by a contractor or a homeowner. The kit preferably provides a plurality of panels 12 and magnetic mechanisms for attachment to existing studs (which may be wood or metal studs). The kit preferably includes panels 12 that preferably are the height of only a portion of the wall, such as, according to some preferred embodiments, about three feet in height. The panels in the kit, according to some preferred embodiments, are provided with a molding component along an edge thereof, such as along the top edge, that preferably meets with or overlaps the wall structure that is designed to be part of the stationary or non-removable wall portion. The kit further includes a mounting component (which may be fasteners such as screws or adhesive) for attachment of the metal component to the wall stud or framing structure. According to alternate embodiments, the metal strips include a fastening element (e.g., points and/or nails) for securing the strips onto a stud. The kit preferably includes panels 12 that may be adjacently placed on the lower wall structure, and more particularly, on the studs. The kit attachment mechanism may include metal strips for mounting to existing (or new) wooden studs to facilitate mounting of the magnetic panels 12 thereon. According to alternate embodiments, the kit may be supplied with metal strips that are configured to cover the stud at locations on the stud where the panel magnets will align when the panel 12 is installed. A plurality of metal strips for attachment to studs may be provided as part of the kit. According to a further embodiment, the kit is provided with one or more chair rail sections, which preferably include one or the other of a metal strip or element and a magnetic element disposed in the rear surface (and preferably countersunk therein relative to the surface). The chair rail section or sections are magnetically attachable to the panel. In this preferred kit embodiment, the panel preferably includes the magnetic strip on the rear panel surface (or embedded thereunder) for attachment of the panel to the wall system structure (e.g., a stud) and magnetic or metal strips under the front panel surface so that the attachment of the chair rail may be readily installed on the panel surface. Preferably, the panel front surface has one or the other of a magnet or metal strip (opposite of what the chair rail has), depending on whether the chair rail carries the magnet or a metal strip.

These and other advantages may be realized with the use of the present invention. While the invention has been described with reference to specific embodiments, the description is illustrative and is not to be construed as limiting the scope of the invention. For example, although the magnets are illustrated and described as being provided on the panels, according to alternate embodiments, the magnetic component is provided as a countersunk magnet that may be countersunk into the wall structure, preferably, the stud (e.g., where the stud is wooden or of a material that has no magnetic property for which the panel to magnetically attach). In these alternate embodiments, the metal strip may be provided as part of the panel. Similarly, the moldings, such as, the chair rail and baseboard, also may be provided with magnets and the panel front surface a metal strip on which the moldings may attach. As discussed herein when a metal strip is referred to for attachment to a magnetic component, the metal strip preferably is made from a material that has magnetic properties (may be magnetized or magnetically attracted when near or at the magnet provided in the panel or on a stud). According to a further alternate embodiment, the panel 12 may be provided with a magnetic element that is magnetically aligned with another magnet, where that the panel and stud each have magnets that attract each other (rather than repel one another). Although the references are made to the panel 12, the alternate panel embodiments 12',112 may be used in the same manner. Various modifications and changes may occur to those skilled in the art without departing from the spirit and scope of the invention described herein and as defined by the appended claims.

What is claimed is:

1. A wall panel configured for removable installation in a wall structure, the wall structure having an upper portion and a lower portion, and the upper portion having an outer portion comprising drywall, the wall panel comprising:
    a panel structure having:
    a front, the front having a front surface;
    a rear, the rear having a rear surface;
    a thickness between the front surface and the rear surface;
    magnetic means for removably attaching the panel to studs of a wall structure;
    wherein said magnetic means comprises the only means for removably attaching the panel to a wall structure, the magnetic means being provided on the panel rear;
    wherein said magnetic means being provided in locations along the rear of the panel that correspond with the centers of studs in the wall structure;
    wherein said panel structure is made from waterproof material;
    wherein the wall panel has a height of about 3 feet; and
    wherein the wall panel is positioned in the lower portion of the wall structure below the drywall when the wall panel is installed in the wall structure.

2. The panel of claim 1, wherein said magnetic means comprises magnets.

3. The panel of claim 1, wherein said magnetic means comprises at least one magnetic strip.

4. The panel of claim 1, the panel having a panel width, a top panel edge and a bottom panel edge relative to said panel width, a right side edge, and a left side edge, wherein said magnetic means comprises a first magnetic strip and a second magnetic strip, said magnetic strips being disposed along a horizontal width of the panel, the first magnetic strip extending continuously from the right side edge of the panel to the left side edge of the panel, the second magnetic strip extending continuously from the right side edge of the panel to the left side edge of the panel, with said first magnetic strip being spaced apart from said second magnetic strip, and wherein said first magnetic strip is provided on said panel proximate to the top panel edge, and wherein said second magnetic strip is provided on said panel proximate to the bottom panel edge.

5. The panel of claim 1, wherein said magnetic means is countersunk relative to the rear surface.

6. The panel of claim 5, wherein said magnetic means is mounted on said rear of said panel and, wherein a covering surface covers said magnetic means.

7. The panel of claim 6, wherein said covering surface is the rear panel surface.

8. The panel of claim 1, the panel having a panel width, a top panel edge and a bottom panel edge relative to said panel width, a right side edge, and a left side edge, wherein said magnetic means comprises a first magnetic component and a second magnetic component, said magnetic components being disposed along a horizontal width of the panel, the first magnetic component extending continuously from the right side edge of the panel to the left side edge of the panel, the second magnetic component extending continuously from the right side edge of the panel to the left side edge of the panel, with said first magnetic component being spaced apart from said second magnetic component, and wherein said first magnetic component is provided on said panel proximate to the top panel edge, and wherein said second magnetic component is provided on said panel proximate to the bottom panel edge.

9. The panel of claim 8, wherein said first and second magnetic components are countersunk relative to the rear surface.

10. The panel of claim 9, wherein said first and second magnetic components are mounted on said rear of said panel and, wherein a covering surface covers said first and second magnetic components.

11. The panel of claim 10, wherein said covering surface is the rear panel surface.

12. The panel of claim 1, including a decorative molding.

13. The panel of claim 12, wherein said decorative molding is mounted to said panel.

14. The panel of claim 13, wherein said decorative molding is removably mountable to said panel.

15. The panel of claim 14, wherein said panel includes a front magnetic component provided on the front of said panel and provided in a location of said panel on which the molding is removably mounted, wherein said molding includes a front and a rear, wherein a magnetizable material is provided on said molding rear, and wherein said molding is removably magnetically attachable to said panel front.

16. The panel of claim 15, wherein a front covering surface covers said front magnetic component and wherein said front covering surface is the front surface of the panel.

17. The panel of claim 15, wherein said molding includes an upper molding provided along the upper edge of said panel, and a lower molding provided along the lower edge of said panel.

18. The panel of claim 17, wherein said front magnetic component includes an upper front magnetic component and a lower front magnetic component;
wherein said upper molding comprises a chair rail having a front and a rear, wherein said magnetizable material is provided on said chair rail rear, and wherein said chair rail is removably magnetically attachable to the panel front thereof at a location corresponding with the panel front upper magnetic component;
wherein said lower molding comprises a baseboard having a front and a rear, wherein said magnetizable material is provided on said baseboard rear, and wherein said baseboard is removably magnetically attachable to the panel front thereof at a location corresponding with the panel front lower magnetic component.

19. The panel of claim 18, wherein said front upper magnetic component and said front lower magnetic component are covered by a front covering surface, wherein said front covering surface is the front surface of the panel.

20. In a wall, the wall including a wall structure having a plurality of supporting elements and a wall surface structure, the supporting elements comprising studs and the wall surface structure comprising drywall, the wall structure having an upper portion and a lower portion, the studs having an upper portion thereof supporting the upper portion of the wall structure and a lower portion thereof supporting the lower portion of the wall structure, the drywall being provided on the upper portion of the wall structure and being mounted on the upper portion of the studs to form the upper wall surface, wherein the improvement comprises:
at least one wall panel as set forth in claim 1;
a demarcation of the drywall forming the upper wall surface, said demarcation being horizontal and being defined by the lower edge of the drywall;
a plurality of metal strips mounted on the portion of the lower portion of the studs, said metal strips being arranged on said lower portion of said studs to correspond with the magnetic component of said panel when the panel is positioned to form the lower wall surface;
said panel being removably mounted on said studs of said wall structure in the location below said demarcation; and
at least one molding provided to cover said demarcation.

21. The wall of claim 20, wherein the panel has a front magnetic component provided on the front of said panel, and wherein said molding includes a front and a rear, wherein a magnetizable material is provided on said molding rear, and wherein said molding is removably magnetically attachable to said panel front at a location corresponding with said panel front magnetic component.

22. The wall of claim 21, wherein the at least one wall panel comprises a plurality of panels, wherein each panel of the plurality of panels has a top edge, and wherein each panel of the plurality of panels is removably magnetically mounted on the lower portion of the studs to form the lower wall surface, the at least one molding covering said demarcation across said top edge of each panel of said plurality of panels and across said lower edge of said drywall.

23. A method for configuring a wall for handling a wet condition, comprising:
forming a demarcation along a horizontal plane of the wall to separate the wall into an upper portion and a lower portion;
providing a plurality of panels as set forth in claim 1;
exposing the lower portion of the framing structure of a wall;
installing a magnetizable component on non-magnetizable structure of said framing structure lower portion; said magnetizable component being installed at a location along said lower framing structure corresponding to the location of said magnetic components located along the rear of the panel;
aligning a panel on the frame structure lower portion so that the panel magnetic components located along the rear of the panel correspond with the magnetizable component installed on the framing structure lower portion, and repeating this step for each panel that is to be installed on the framing structure lower portion;
installing removable molding along the demarcation to cover the drywall lower edge and the panel top edge;
selectively removing one or more of said panels and said molding thereon and exposing the lower portion of the framing structure of a wall that was previously covered by said removable panel;
allowing the wet condition to subside and providing an optional treatment to the wall;
returning the panels that were removed to the frame structure lower portion, aligning the panel magnetic components located along the rear of the panel to correspond with the magnetizable component installed on the framing structure lower portion, and repeating this step for each removed panel that is to be re-installed on the framing structure lower portion; and
reinstalling the removable molding;
wherein the panels are provided with cutouts at the top thereof in a location that the removable molding covers when the removable molding is installed along the demarcation, and wherein selectively removing one or more of said panels includes grasping one or more of the cutouts.

24. A kit for facilitating remediation of a wet condition or an anticipated wet condition, the kit comprising:
a plurality of panels as set forth in claim 15 and each having a front magnetic component that includes an upper front magnetic component and a lower front magnetic component;
an upper molding comprising a chair rail;
a lower molding comprising a baseboard;
the upper molding including a front and a rear, wherein a magnetizable material is provided on said upper molding rear, and wherein said upper molding is removably magnetically attachable to each of the panels at the panel front thereof at a location corresponding with that panel's panel front upper magnetic component;

the lower molding including a front and a rear, wherein a magnetizable material is provided on said lower molding rear, and wherein said lower molding is removably magnetically attachable to each of the panels at the panel front thereof at a location corresponding with that panel's panel front lower magnetic component;

a plurality of strips constructed from a magnetizable material and configured for attachment to a stud.

25. The panel of claim 1, the panel having a top panel edge, the top panel edge having a finger cut-out formed therein to facilitate removal of the panel from the wall structure.

* * * * *